June 30, 1959   B. E. BARTELS   2,892,250
METHOD OF PRODUCING PHOTOCELLS
Filed Nov. 3, 1954   3 Sheets-Sheet 1
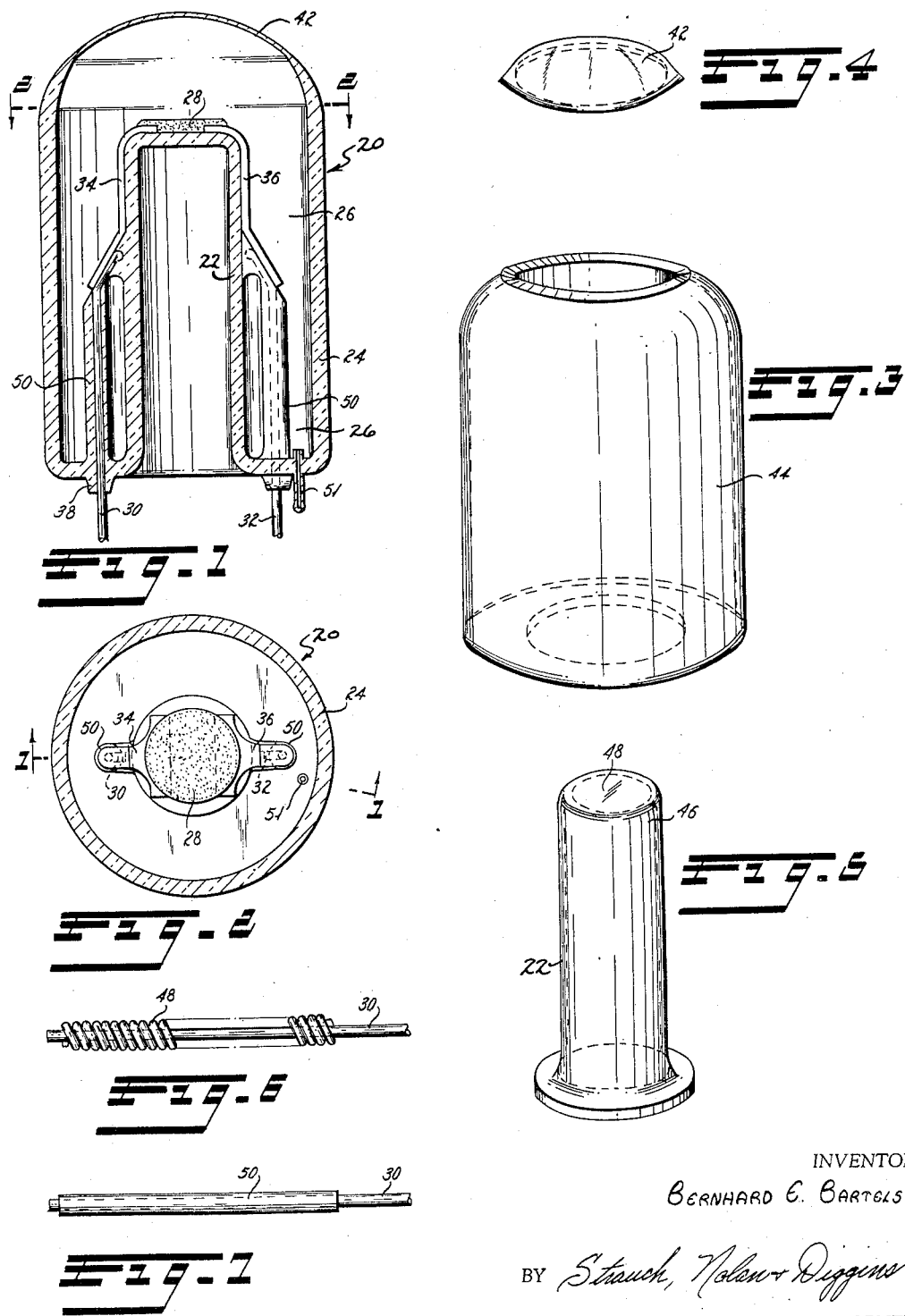
INVENTOR
BERNHARD E. BARTELS
BY Strauch, Nolan + Diggins
ATTORNEYS June 30, 1959     B. E. BARTELS     2,892,250
METHOD OF PRODUCING PHOTOCELLS
Filed Nov. 3, 1954     3 Sheets-Sheet 2
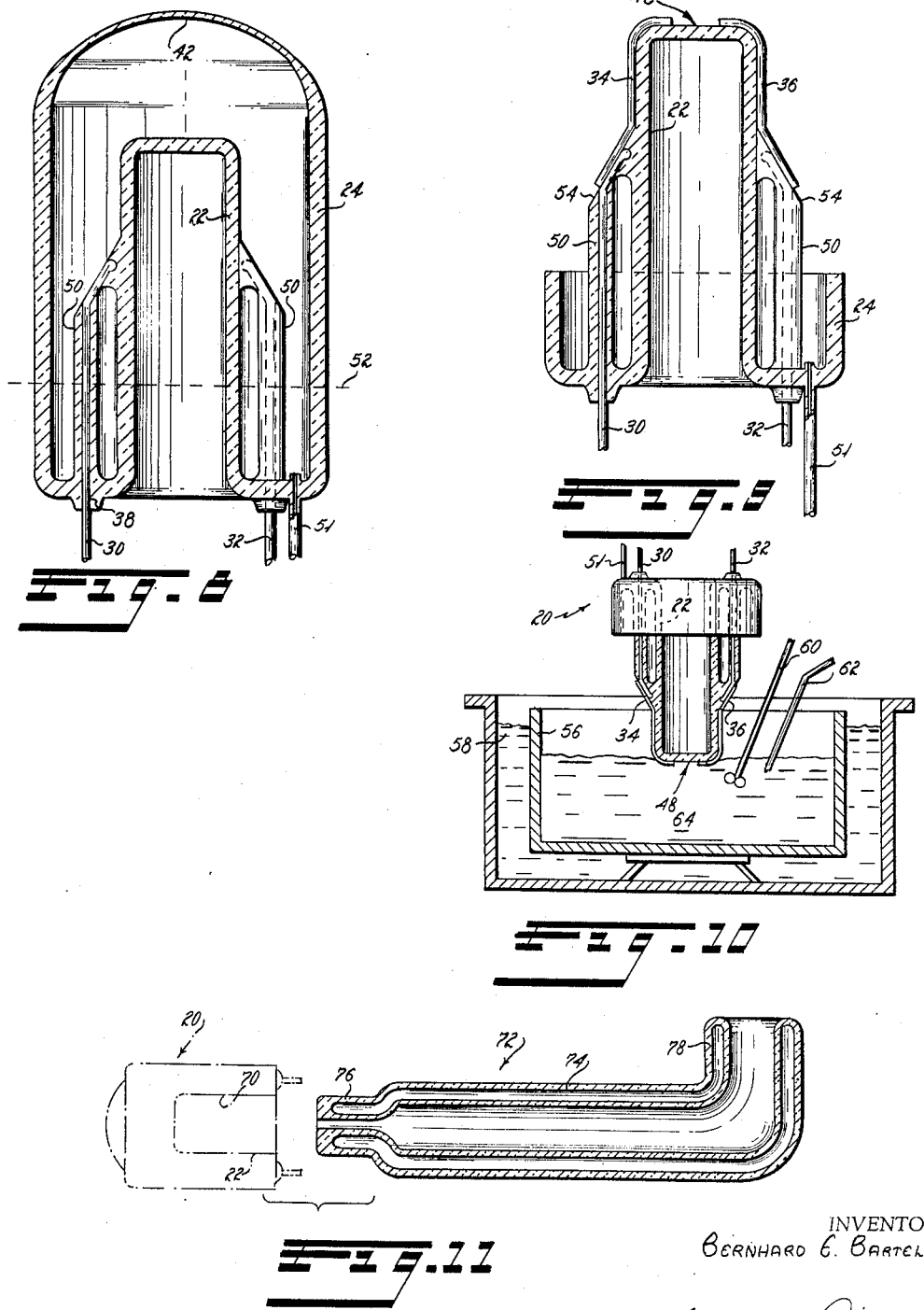
INVENTOR
BERNHARD E. BARTELS
BY Strauch, Nolan & Diggins
ATTORNEYS June 30, 1959  B. E. BARTELS  2,892,250
METHOD OF PRODUCING PHOTOCELLS
Filed Nov. 3, 1954  3 Sheets-Sheet 3

INVENTOR
BERNHARD E. BARTELS

BY Strauch, Nolan & Diggins
ATTORNEYS

United States Patent Office 2,892,250
Patented June 30, 1959

2,892,250
METHOD OF PRODUCING PHOTOCELLS

Bernhard E. Bartels, Glenwood Landing, N.Y., assignor, by mesne assignments, to Hupp Corporation, Cleveland, Ohio, a corporation of Virginia Application November 3, 1954, Serial No. 466,502

3 Claims. (Cl. 29—155.63)

This invention relates to photocells and more particularly to infra-red sensitive photoconductive cells and methods of producing the same.

In copending application Serial No. 435,248, filed June 8, 1954, by Yves A. Rocard and Bernhard E. Bartels, it is pointed out that the transparency of the atmosphere to infra-red varies greatly over the infra-red spectrum, due primarily to selective absorption of infra-red by the water vapor and carbon dioxide normally present in the atmosphere. The copending application further points out that the best transparency (least amount of infra-red filtering by moisture and carbon dioxide in the atmosphere) occurs at 3.5–4.2 and 8–12 microns, and the application by means of infra-red emissivity curves for heated bodies at various temperatures establishes that maximum signal-to-noise ratio (i.e., ambient temperature "noise") may be obtained in the 3.5–4.2 micron range. Accordingly, photocells having good spectral response at wave lengths within this 3.5–4.2 micron range, termed an "atmospheric window" by reason of the transparency of the atmosphere to radiation of wavelengths falling within it, are best suited for use in the detection of infra-red emitting or reflecting bodies distantly spaced in the atmosphere.

The aforesaid copending application includes graphs showing the response characteristics of various types of photocells, including lead sulfide cells of both evaporated and chemically deposited lead sulfide layer types, and these graphs clearly demonstrate the superior response characteristics of the lead sulfide cells to radiation of wavelengths falling within the 3.5–4.2 micron range of optimum atmospheric transparency, when the cells are operated at temperatures of about —180° C. which is approximately that of liquid air. One of these graphs, reproduced herein as Figure 13, shows that chemically deposited lead sulfide photosensitive elements have higher signal-to-noise ratios than the evaporated layer type photo-elements, hence maximum useful response to infra-red radiant energy transmitted through the atmosphere should be obtainable by use of the cooled, chemically deposited lead sulfide photo-elements.

As noted in said copending application, however, side reactions and other manufacturing difficulties, and cost considerations primarily attributable thereto, have heretofore tended to limit production and use of the chemically deposited lead sulfide type photocells. Moreover, these photocells as heretofore commercially produced have failed to provide the high sensitivity, reproducibility of response, low inertia and great stability of which cells of this type are characterized when fabricated by the novel methods hereinafter disclosed, and the dark resistance of the prior photocells generally has poorly matched the input of conventional amplifiers (i.e., the resistance of the photocell generally is too high).

Accordingly, it is the primary purpose of the present invention to provide new and improved photocells, particularly chemically deposited lead sulfide cells, not subject to the manufacturing difficulties and poor response characteristics of such photocells as heretofore produced, and novel methods of manufacturing photocells at relatively low cost and with good response reproducibility from cell to cell. While the invention herein disclosed is directed primarily to chemically produced photocells of the type described, in certain of its aspects it is applicable to photocells and like devices generally, hence the appended claims are not to be construed as restricted to photocells of particular type or method of manufacture except as expressly thus limited.

It is, therefore, one of the fundamental objects of the present invention to provide new and improved infra-red sensitive photocells having optimum spectral response in the range of maximum atmospheric transparency to infra-red, and to provide novel methods for the manufacture of such photocells.

It is another important object of this invention to provide new and improved infra-red sensitive photocells of chemically deposited lead sulfide type, characterized by improved stability, high sensitivity and signal-to-noise ratio, good reproducibility of response, low time constant and compact size, and also to provide novel methods for the deposition and sensitization of the photosensitive lead sulfide in such photocells.

It is also an object of the present invention to provide new and improved photocells which when cooled have optimum response to infra-red of wavelengths to which the atmosphere is relatively transparent, said photocells being structurally adapted to and provided with coolant supply means for assuring cell operation at the desired low temperatures.

Another object of this invention is the provision of novel methods for the fabrication of photocells and like devices wherein damage to the sensitive material within the cells due to heating operations necessary to cell manufacture is minimized, whereby better response characteristics and reproducibility of response characteristics from cell to cell may be obtained.

Still another object of the present invention resides in the provision of novel methods and materials for production of electrodes in photocells and like devices.

A further object of this invention involves new and improved methods and means for providing electrical connection of the photosensitive materials to external lead wires in photocells and similar devices.

These and other objects, features and advantages of the present invention will become more fully apparent by reference to the appended claims and the following detailed description when read in conjunction the accompanying drawings, wherein:

Figure 1 is a sectional view of a complete photocell taken substantially on the line 1—1 of Figure 2;

Figure 2 is a sectional view taken on the line 2—2 of Figure 1;

Figures 3–7 are views of components of the cell of Figure 1 and illustrate steps in the assembly of its components;

Figures 8 and 9 are sectional views of a photocell at different steps in its manufacture;

Figure 10 is a part sectional view of a chemical reaction vessel and shows a photocell partially immersed in the reagent solution in said vessel for deposition of photosensitizable material on the immersed surface of the photocell;

Figure 11 is a sectional view of an assembly for cooling a photocell;

With continued reference to the drawings, wherein like reference numerals are used throughout to designate like elements, Figure 1 shows a complete infra-red responsive photocell produced in accordance with the present invention.

Figure 12:
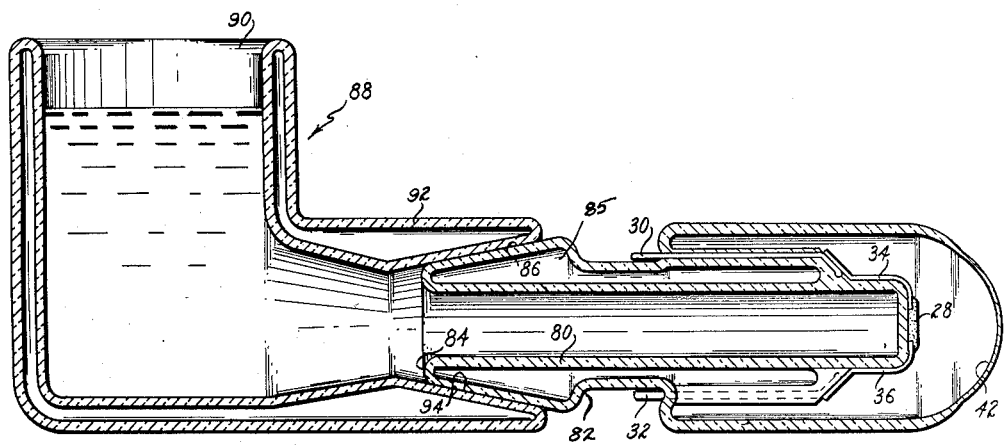
Figure 12 is a sectional view of a modified form of photocell and cooling means therefor.

The photocell of Figure 1 comprises a cell envelope 20 fabricated of a suitable glass such as the sodium borate glass sold under the trade name "Duran" and manufactured by the Schott Glass Company in Germany. Envelope 20 includes an inner thimble 22 and an outer tubular shell 24 integrally connected to the thimble to define an annular chamber 26 therebetween. A layer 28 of infra-red sensitive lead sulfide is situate on the top surface of the thimble, and lead wires 30 and 32 are connected to the sensitive layer 28 through electrodes 34 and 36, respectively. Lead wires 30 and 32 extend to the exterior of the envelope through a fused glass joint between thimble 22 and shell 24, and are of tungsten or other suitable material capable of fusing with and thus sealing to the glass of the cell envelope as at 38.

The upper end of the photocell is closed by a thin convex glass window 42, which may be part spherical in shape as shown and should be made sufficiently thin to be capable of transmitting radiation within the range of response of the photosensitive layer. Thin glass windows of about 50 microns thickness will permit transmission of infra-red radiation up to about 6 microns wavelength. In order to allow such thin windows to resist the possibility of breakage due to atmospheric pressure, they preferably are of outwardly convex shape. This convexity of the extremely thin window admits a solid angle of about 90° and at the same time increases the resistance to breakage due to atmospheric pressure. By properly gauging the thickness and curvature of the cell window it is possible to produce cells allowing at least 60% transmission of infra-red radiation of wavelengths up to 5 or 6 microns.

Alternatively, the window 42 may if desired be produced by inwardly depressing an initially flat plate fused to the upper end of the cell envelope, to thus provide an inwardly convex thin glass window as disclosed in the copending application of Yves Rocard and Bernhard Bartels, Serial No. 395,168, filed November 30, 1953.

The cell envelope 20 preferably is formed in steps of taking a glass tube 44 (Figure 3) of suitable size, for example of an external diameter of 30 mm. and wall thickness of 1 mm., and a convex glass window 42 (Figure 4) having a mounting rim of a diameter permitting attachment to the tube 44, and fusing the abutting edges of the tube and window together to form the outer protective shell 24. Window 42 is preferably of the form and thickness described above, but its rim portion may be made of greater thickness to facilitate attachment to tube 44.

The inner glass unit or thimble 22 is formed of a glass tube 46 (Figure 5) having in this example an out-side diameter of about 18 mm. and 1 mm. thick. The upper end 48 of thimble 22 is closed, preferably by glass formed integrally with the tubular portion of the thimble. I have found that this integral, one-piece thimble structure is preferable to structures wherein the thimble end is closed by an initially separate glass plate fused to the thimble tubular portion, apparently because it minimizes irregularities and inhomogeneities in the glass in the different portions of the thimble particularly at joints therein, and thus provides perfectly smooth and homogeneous surfaces over which the electrodes and photosensitive materials may be deposited. As a result, less internal "noise" will be detected in the finished photocell and its signal-to-noise ratio will be correspondingly higher.

Lead wires 30 and 32 may if desired be attached to thimble 22 prior to its insertion in the outer shell 24 of the cell envelope. These lead wires preferably are, as shown in Figure 1, provided with a covering of glass which may be formed about the wires in the manner illustrated in Figures 6 and 7. In Figure 6, a thin glass rod 48 is heated to a temperature at which it may easily be bent, and then is wrapped as tightly as possible about the lead wire 30 along the portion thereof which ultimately will be situate within the cell envelope. The resulting assembly then is heated to a temperature at which the coils of glass about the lead wire will fuse to each other and to the wire, thus providing an integral glass sheathing 50 (Figure 7) over the wire.

Next, the cell envelope parts prepared as just described are assembled and sealed together, the upper ends of the glass sheathing 50 of lead wires 30 and 32 being fused to the side walls of thimble 22 and the lower ends of the lead wire sheaths being fused into the joint between the joined ends of thimble 22 and outer shell 24 as shown in Figure 8, which illustrates the completed cell envelope.

During this assembly operation a glass capillary tube 51 may be sealed into the cell envelope, opening into the space 26 therein, for the purpose of evacuating the cell after deposition of its lead sulfide layer and photosensitization thereof as hereinafter disclosed. When these operations have been completed the tube 51 is sealed off as by heating it close to the base of the cell. In practice, the exhaust tube would be located approximately midway between lead wires 30 and 32 rather than adjacent one of the wires as shown, in order to minimize heating of the lead wires and consequent heating of the photosensitive layer during tube sealing.

It is to be understood that the several assembly steps just described need not be carried out in the particular order given. For example, the step of fusing the coiled glass rods 48 about the lead wires could if desired be carried out concurrently with the final envelope assembly operation; similarly, the lead wire grinding step now to be described could if desired be carried out prior to assembly of the thimble within the outer shell 24.

After fabrication and assembly of the cell envelope 20 and its lead wires 30 and 32, the outer tubular shell 24 of the envelope is transversely cut or broken as, for example, by local application of heat on a circumferential line about the outer shell between the ends thereof, as indicated by dotted line 52 in Figure 8. Later, after application of electrodes 34 and 36 and infra-red sensitive layer 28, the two parts of the cell envelope are reassembled and sealed as by a fused glass joint along the line of separation. It would also be possible simply to postpone assembly of the outer shell onto the thimble-lead wire assembly until after the electrodes and sensitive layer have been formed, but the procedure just described is preferred by reason of the fact that it minimizes conductance of heat through the tungsten lead wires and electrodes to the photosensitive material, application of heat to the lead wires being necessary to formation of the fused glass joint between the thimble and outer shell. By forming this glass joint prior to deposition of the photosensitive material, then splitting the envelope and later rejoining the parts by a fused joint spaced from the original joint and the lead wires embedded therein, the portion of the glass outer shell remaining between the line on which it was split and the lead wires, tends to insulate those wires from the heat applied in again fusing together the envelope parts, thus reducing transfer of heat to the sensitive layer and consequent injury thereto to a minimum.

The cell envelope after removal of the upper part of its outer shell appears as illustrated in Figure 9, wherein it is evident that the upper portion of thimble 22 is fully exposed to facilitate production of the photosensitive layer and electrodes thereon.

Before proceeding with these operations, however, the upper ends of lead wires 30 and 32 must first be exposed to permit their connection to the electrodes. The lead wires preferably are thus exposed by grinding the glass sheaths 50 in which the wires are embedded, to provide substantially planar surfaces through which the lead wires are exposed as indicated at 54 in Figure 9. The lead wire ends are then ground with a very fine abrasive and polished until the ends are perfectly flat and free from scratches. This is a very important operation because any roughness at these points may cause noise and thus lower the signal-to-noise ratio of the finished cell.

Electrodes 34 and 36 extend between the substantially flat upper surface 48 of thimble 22 and the exposed ends 54 of lead wires 30 and 32, and comprise relatively thin deposits of an electrically conductive material such as one of the graphite-containing compounds widely sold under the trade name "Aquadag" or, preferably, of a metal or metals such as gold, silver, platinum or the like deposited by chemical reduction, electrodeposition, evaporating or otherwise as convenient, the electrodes preferably being patterned generally as shown in Figures 1 and 2.

While any of the class of electrode materials outlined in the preceding paragraph will perform satisfactorily in the photocells of this invention, I have found that best results may be obtained by use of alternate layers of platinum and gold, the outermost layer preferably being gold. Good results have also been obtained using either the gold or platinum alone, in a plurality of separately applied layers. Plural relatively thin layers yield better results than a single relatively thick layer, apparently because the plural layers are more uniform and free of porosity than a single layer even if of thickness equal to the total thickness of the plural layers.

The gold and/or platinum may be deposited in pattern on the thimble and in contact with lead wires 30 and 32 in any convenient manner, as for example by a conventional electroplating or chemical reduction process wherein the metal plates out in native form on the thimble. Plating of the metal in the desired electrode pattern may be effected by painting the thimble prior to plating with asphaltum or other suitable resist material applied in a pattern complementary to that desired for the electrodes. The resist may be removed after the electrodes have been applied as by a suitable solvent.

Graphite electrodes also offer certain advantages for use in these cells, particularly because they provide a characteristically low noise level in the finished photocell. Precautions must be taken, however, to prevent their softening or dissolving in the solutions utilized in depositing the photosensitive layer. For this reason metal electrodes as described above are generally preferred.

After application of electrodes 34 and 36, the infrared sensitive lead sulfide layer 28 may be formed over and between the electrodes, this being carried out in accordance with the invention in two distinct steps: (1) A completely homogeneous layer of lead sulfide is deposited over the end of thimble 22; and (2) this PbS layer is annealed at a selected temperature and in a suitable atmosphere for a time sufficient to provide optimum infra-red sensitivity in the finished photocell.

In a preferred method for deposition of the lead sulfide, three solutions are prepared as follows:

(1) Lead acetate, $Pb(CH_3COO)_2$, in distilled water (from 1.0 N to 0.1 N)
(2) Thiourea, $CS(NH_2)_2$, in distilled water (from 1.0 N to 0.1 N)
(3) Sodium hydroxide, NaOH, in distilled water from 1.0 N to 0.1 N)

The first two of these solutions are mixed together in a reaction vessel such as schematically shown at 56 in Figure 10, preferably provided with a thermostatically controlled water bath 58 or other means for maintaining the reaction mixture in the vessel at desired constant temperature. A stirring device 60 of conventional type, preferably power driven, may be provided for agitating the reaction solution and effecting rapid and thorough mixing of its constituent reagents. As noted, only two of the three solutions—namely, the lead acetate and thiourea solutions—are initially added to the reaction vessel; the third is added later, preferably through a tube as shown at 62 (Figure 10) having its discharge end positioned beneath the surface of the liquid initially placed in the vessel.

The photocell 20 is as shown in Figure 10 held in a position such that the end of thimble 22 is immersed to a depth of a few millimeters in the solution, the cell being maintained in this position by any suitable clamping device (not shown).

The temperature of water bath 58 is held between 40 and 60° C., so that the temperature of the reaction solution in vessel 56 will remain between these temperature limits and preferably between 45 and 50° C. After temperature equilibrium is reached, stirring device 60 may be set for relatively slow operation, to provide slow but continuous agitation of the reagent solution during the lead sulfide deposition operation.

The third reagent solution—of sodium hydroxide—then is added through tube 62, and the reagents in solution immediately react together in accordance with the following equation:

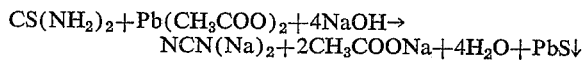
$$CS(NH_2)_2 + Pb(CH_3COO)_2 + 4NaOH \rightarrow$$
$$NCN(Na)_2 + 2CH_3COONa + 4H_2O + PbS\downarrow$$

For processing each photocell, the absolute amounts of the three reagent solutions placed in the reaction vessel preferably are so calculated that about 0.1 to 1.0 gram of lead sulfide will be produced by the reaction, the ratio of the volumes of the three indicated solutions necessary to produce this yield being readily determined by simple calculation based on the chemical equation given. Only a small portion of the lead sulfide produced precipitates out on the thimble 22, however, the balance precipitates on the walls of the reaction vessel or in the form of a powder within the vessel.

The precipitation reaction commences on addition of the sodium hydroxide solution to the others previously placed in the vessel, and proceeds at a rate dependent on solution temperature. Thus, the time of reaction may be varied between wide limits (several seconds to several minutes) by varying solution temperature between the 40 and 60° C. limits of the preferred range given above. During this reaction, the originally transparent solution of reagents becomes opaque, and a smooth and homogeneous layer of lead sulfide is produced over and between the electrodes on thimble 22. After completion of the reaction, the cell is removed from the vessel, carefully washed in distilled water and dried in air.

In an alternative method of forming the lead sulfide layer, a solution of lead oxide (PbO) in a distilled water solution of sodium hydroxide (NaOH), and a solution of thiourea in water, are substituted for solutions 1 and 2 and solution 3, respectively, in the lead sulfide precipitation process first described. The resultant reaction, which may be carried out in substantially the same manner as that already described, goes in accordance with the equation:

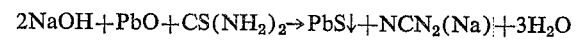
$$2NaOH + PbO + CS(NH_2)_2 \rightarrow PbS\downarrow + NCN_2(Na) + 3H_2O$$

The reaction proceeds relatively slowly, requiring approximately 30 minutes for completion at a solution temperature of about 45° C., but yields a photosensitive layer characterized by a slightly more pronounced response shift toward the longer wavelength end of the spectrum than are photosensitive layers produced by the method first described.

I have found that the response characteristics of photocells produced by both the foregoing methods may be significantly improved by depositing the lead sulfide in two or more distinct superposed layers, rather than in a single layer as has heretofore been the practice. These plural layers may be produced simply by repeating the lead sulfide deposition steps described, two or more times as necessary to produce the desired number of layers of photosensitive material. The deposited lead sulfide should be thoroughly washed in distilled water between runs and a clean reaction vessel and stirrer used for each run. Also, the quantities of reagents used in each run preferably are reduced so as to produce lead sulfide layers each of substantially smaller thickness than the lead sulfide layer of single layer cells, though the total thickness of the several layers may equal or exceed that in the single layer cells. Since single layer cells provide generally satisfactorily response characteristics for most photocell applications, it generally is preferred to utilize the plural layer techniques only in the production of cells for special applications wherein maximum sensitivity is required.

Photosensitization of the lead sulfide is in accordance with the present invention carried out by placing the cell, with its interior exposed to atmosphere and the oxygen thereof through tube 51, in an oven and baking it at a temperature preferably between 125 and 150° C. until the resistance of the sensitized layer has reached or substantially reached a maximum. This usually requires about one-fourth to one-half hour, but may require considerably more time particularly in cells wherein the lead sulfide layer has been deposited by the second of the deposition processes described above, i.e., that utilizing a lead oxide-caustic soda solution as one of the starting materials.

After the lead sulfide layer has reached its resistance maximum, the exhaust tube 51 may then be connected to an exhaust pump (not shown) of suitable type capable of producing vacua preferably down to $10^{-5}$ or $10^{-6}$ mm. of mercury. The cell is held under such vacuum by the pump preferably for about one hour, meanwhile maintaining cell temperature at about 75° C., and while still evacuated is permanently sealed as by flame sealing the exhaust tube 51 closely adjacent the base of the cell.

As noted, the photocells of the present invention provide optimum sensitivity to infra-red between 3.5 and 4.2 microns when cooled to approximately the temperature of liquid air. One means for maintaining photocells at this temperature is illustrated in Figure 11. With reference to that figure, a portion 70 of the inner wall of thimble 22 of the photocell is treated to present a ground surface, as also indicated at 70 in Figure 11. A body 72 preferably of double wall construction, as in the familiar Dewar flask in which there is a vacuum in the space between the two walls, has a shank portion 74 providing a ground glass surface 76 which may be inserted into the open end of thimble 22, to make a tight fit with the surrounding ground glass portion 70 of the thimble. The body 72 also has a bowl portion 78 communicating with its shank portion 76, and when liquid air is poured into the bowl it flows into the interior of the thimble to maintain the radiation sensitive material 28 on the end thereof at the desired low temperature.

When the body 72 and the communicating interior of the thimble are filled with about 200 cc. of liquid air, the cell will operate at a temperature of about −180° C. for approximately one hour before it becomes necessary to recharge the device.

Referring now to Figure 12, the photocell and associated cooling means shown in this figure differ from those previously described primarily in providing better thermal insulation for the liquid air contained in the photocell and coolant reservoir. In this embodiment, both the inner thimble 80 and the outer tubular shell 82 of the cell envelope are laterally extended to fit within the end of the coolant reservoir, the thimble and outer shell being fused together at their outer ends as indicated at 84. Thimble 80 and shell 82 are of different diameters so as to define an annular chamber 85 which extends from the outer end 84 of the photocell to the hollow interior of the main body of the cell envelope. The cell otherwise is similar to those of Figures 1–11, and like the others is evacuated during the final assembly operation. The annular chamber 85 when thus evacuated serves to insulate the interior of thimble 80 from heat transfer thereto and, accordingly, extends the useful life of the coolant contained therein. Coolant reservoir 88 may, like that of Figure 11, include bowl, shank and ground glass portions 90, 92 and 94, respectively.

If desired, the interior of thimble 22 of Figure 1 or 80 of Figure 12 may be provided with a radiation shield (not illustrated) consisting of a reflecting surface of silver or the like coated over all save the upper end one of the thimble interior surfaces. This reflecting surface minimizes heat transfer to the liquid air, thus slowing vaporization thereof and permitting a longer period of operation before recharging becomes necessary.

Figure 13:
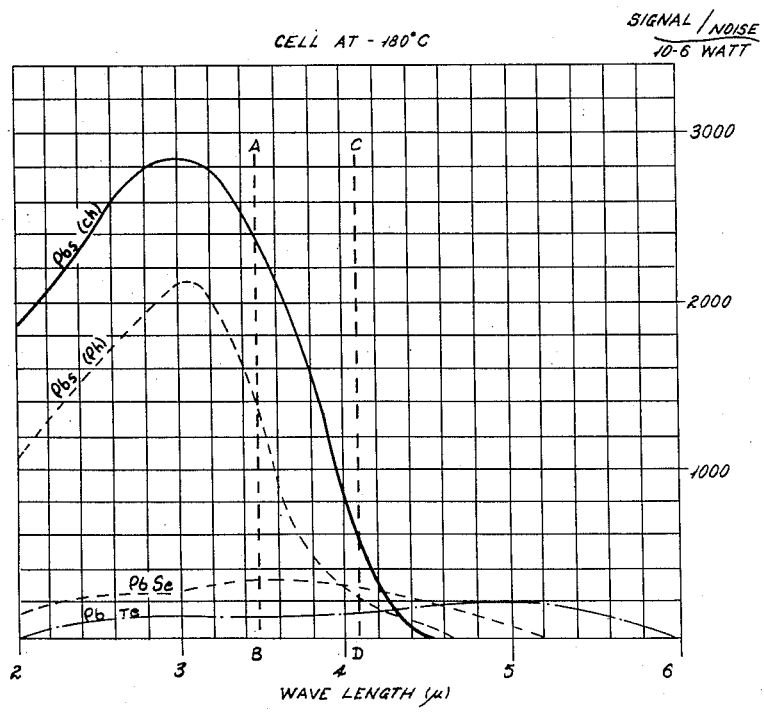
Figure 13 shows, by way of curves, the spectral response of a chemically produced lead sulfide photocell, an evaporated lead sulfide cell, and lead telluride and lead selenide cells, all operating at —180° C.

The graph of Figure 13 shows the spectral response of chemically deposited lead sulfide cells (designated PbS(Ch) in the graph) as well as those of evaporated layer lead sulfide cells (PbS(Ph)), lead selenide cells (PbSe) and lead telluride (PbTe), all operating at −180° C. The atmospheric "window" of maximum transparency to infra-red is designated by lines AB and CD at 3.5 and 4.2 microns, respectively. As will be apparent from the graph, chemically deposited lead sulfide cells provide highest signal-to-noise ratio (effective sensitivity) not only when stimulated by radiation of wavelengths falling within the atmospheric "window," but highest sensitivity to other infra-red wavelengths as well. Photocells of this type and produced in accordance with the present invention also are characterized by good reproducibility of response characteristics from cell to cell, low time constant and improved stability and service life, in addition to the high sensitivity and signal-to-noise ratio demonstrated by the graph of Figure 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and wish to protect by United States Letters Patent is:

1. In the production of a photosensitive cell in which electrodes are disposed on an interior surface of the cell envelope, the method which comprises the steps of chemically precipitating from solution a substantially uniform layer of lead sulfide onto said cell surface and on and between the electrodes thereon, heating the lead sulfide layer in the presence of oxygen while observing an indication of the electrical resistance of said layer until the electrical resistance of the lead sulfide layer substantially reaches a maximum, and then cooling, evacuating and sealing the cell envelope.

2. The method defined in claim 1 wherein said lead sulfide layer is precipitated from an aqueous solution of thiourea, sodium hydroxide and a compound selected from the group consisting of lead oxide and lead acetate and wherein said solution is maintained at a temperature between 40°–60° C. during the precipitation reaction.

3. In the production of a photosensitive cell in which electrodes are disposed on an interior surface of the cell envelope, the method which comprises the steps of chemically precipitating from an aqueous solution of thiourea, sodium hydroxide and a compound selected from the group consisting of lead oxide and lead acetate a substantially uniform layer of lead sulfide onto said cell surface and on and between the electrodes thereon, photosensitizing the lead sulfide layer thus produced by heating in the presence of oxygen to a temperature of approximately 125–150° C. and holding at such temperature while observing a measurement of the electrical resistance of said layer until the electrical resistance of the lead sulfide layer reaches a maximum, and then cooling; evacuating and sealing said cell envelope.

References Cited in the file of this patent

UNITED STATES PATENTS

| | | |
|---|---|---|
| 1,668,095 | Weigett | May 1, 1928 |
| 2,448,516 | Cashman | Sept. 7, 1948 |
| 2,544,261 | Gibson | Mar. 6, 1951 |
| 2,544,554 | Holmes | Mar. 6, 1951 |
| 2,547,173 | Rittner | Apr. 3, 1951 |
| 2,553,420 | McFee | May 15, 1951 |
| 2,659,682 | Andersen | Nov. 17, 1953 |
| 2,727,119 | Thomson | Dec. 13, 1955 |
| 2,793,275 | Breckenridge et al. | May 21, 1957 |

FOREIGN PATENTS

| | | |
|---|---|---|
| 610,361 | Great Britain | Oct. 14, 1948 |

OTHER REFERENCES

Electronic Engineering, October 1946, pages 316, 317 and 323.

Zworykin "Photoelectricity and its Applications" pages 189–191. July 14, 1949.